US 12,517,526 B2

(12) United States Patent
Daniel et al.

(10) Patent No.: US 12,517,526 B2
(45) Date of Patent: Jan. 6, 2026

(54) METHOD FOR RECOGNIZING A STATE OF AN ACCESS ELEMENT, SUCH AS A WINDOW OR A DOOR, IN A HOUSEHOLD, FLOOR ROBOT AND SYSTEM

(71) Applicant: BSH Hausgeräte GmbH, Munich (DE)

(72) Inventors: Kristina Daniel, Bad Neustadt (DE); Frank Schnitzer, Bad Neustadt (DE); Josephine Wittkowski, Traunstein (DE)

(73) Assignee: BSH Hausgeräte GmbH, Munich (DE)

( * ) Notice: Subject to any disclaimer, the term of this patent is extended or adjusted under 35 U.S.C. 154(b) by 81 days.

(21) Appl. No.: 18/581,605

(22) Filed: Feb. 20, 2024

(65) Prior Publication Data

US 2024/0281006 A1    Aug. 22, 2024

(30) Foreign Application Priority Data

Feb. 22, 2023   (DE) .......................... 102023201628.1

(51) Int. Cl.
  *G05D 1/648*    (2024.01)
  *G05D 105/10*   (2024.01)
  (Continued)

(52) U.S. Cl.
  CPC ......... *G05D 1/648* (2024.01); *G05D 2105/10* (2024.01); *G05D 2105/80* (2024.01); *G05D 2107/40* (2024.01)

(58) Field of Classification Search
  CPC ........ G05D 1/648; G05D 1/243; G05D 1/689; G05D 2105/10; G05D 2105/80;
  (Continued)

(56) References Cited

U.S. PATENT DOCUMENTS 10,551,841 B2   2/2020   Yun et al.
10,643,582 B2   5/2020   Ichiki
(Continued)

FOREIGN PATENT DOCUMENTS

CN    111950440 A   * 11/2020  ............. G06V 20/10
CN    113341752 B   *  4/2023  ............. G05B 15/02
(Continued)

OTHER PUBLICATIONS

Romoa et al.; Real-Time 3D Door Detection and Classification on a Low-Power Device; 2020 IEEE International Conference on Autonomous Robot Systems and Competitions (ICARSC) Apr. 15-16, Ponta Delgada, Portugal (Year: 2020).*
(Continued)

*Primary Examiner* — Michael J Zanelli
(74) *Attorney, Agent, or Firm* — Laurence A. Greenberg; Werner H. Stemer; Ralph E. Locher (57) ABSTRACT

An individual access element to a room in a household can be brought into an open state and into a closed state. A method for recognizing an individual state of the access element includes the steps of determining a position at which an individual access element is located in the household, non-contact scanning the individual access element while it is in a predetermined state, storing information regarding the individual access element on the basis of its scan and state, capturing a further non-contact scan of the individual access element in the household, and recognizing a state of the individual access element on the basis of the further non-contact scan and the stored and predetermined information. A floor robot and a system having a floor robot, are also provided.

14 Claims, 4 Drawing Sheets

(51) Int. Cl.
   *G05D 105/80*   (2024.01)
   *G05D 107/40*   (2024.01)
(58) Field of Classification Search
   CPC .......... G05D 2105/85; G05D 2107/40; G05D 2109/10; G05D 2111/10; A47L 11/4011; A47L 2201/00
   See application file for complete search history.

(56) References Cited

U.S. PATENT DOCUMENTS

| | | | |
|---|---|---|---|
| 10,717,193 B2 | 7/2020 | Noh et al. | |
| 10,835,096 B2 | 11/2020 | O'Dea et al. | |
| 11,789,447 B2 | 10/2023 | Artes et al. | |
| 2014/0207280 A1 | 7/2014 | Duffley et al. | |
| 2019/0246858 A1* | 8/2019 | Karasikov | A47L 9/2894 |
| 2019/0248014 A1* | 8/2019 | Deyle | B25J 13/006 |
| 2020/0053325 A1* | 2/2020 | Deyle | H04N 7/185 |
| 2020/0162700 A1* | 5/2020 | Kim | H04N 5/00 |
| 2023/0037747 A1* | 2/2023 | Forsberg | A47L 9/2852 |

FOREIGN PATENT DOCUMENTS

| | | | | |
|---|---|---|---|---|
| DE | 102015121666 B3 | 5/2017 | | |
| DE | 102018113672 A1 | 12/2018 | | |
| DE | 102017209032 B4 | 7/2019 | | |
| DE | 112017001537 B4 | 9/2021 | | |
| DE | 112017003905 B4 | 4/2022 | | |
| EP | 3508937 A1 * | 7/2019 | ....... | G06V 30/19173 |

OTHER PUBLICATIONS

Rusu et al.; Functional Object Mapping of Kitchen Environments; 2008 IEEE/RSJ International Conference on Intelligent Robots and Systems Acropolis Convention Center Nice, France, Sep. 22-26, 2008 (Year: 2008).*

Spournias et al.; Door Detection Algorithm Development Based on Robotic Vision and Experimental Evaluation on Prominent Embedded Systems; © Springer International Publishing AG 2017 A. Ronzhin et al. (Eds.): ICR 2017, LNAI 10459, pp. 250-259, 2017. DOI: 10.1007/978-3-319-66471-2_27 (Year: 2017).*

* cited by examiner

METHOD FOR RECOGNIZING A STATE OF AN ACCESS ELEMENT, SUCH AS A WINDOW OR A DOOR, IN A HOUSEHOLD, FLOOR ROBOT AND SYSTEM

CROSS-REFERENCE TO RELATED APPLICATION

This application claims the priority, under 35 U.S.C. § 119, of German Patent Application DE10 2023 201 628.1, filed Feb. 22, 2023; the prior application is herewith incorporated by reference in its entirety.

FIELD AND BACKGROUND OF THE INVENTION

The invention relates to the monitoring of a household. In particular, the invention relates to determining the state of an access element, such as a window or a door, in the household. The invention also relates to a floor robot and a system having a floor robot.

A floor robot is configured so as to work on a floor surface in a household. The floor robot can navigate autonomously in the household and cover practically the entire household within the scope of its activity.

It has been proposed to use the floor robot to monitor the household, for example to replace or improve an alarm system. For example, the floor robot can include a pyrotechnic sensor or a smoke sensor to warn of an imminent fire hazard, a LIDAR motion sensor, or a passive infrared sensor to detect a person in the household.

U.S. Publication No. 2014/0207280 A1 proposes a system for monitoring a room. The system includes a mobile robot that can be used to detect an open door or an open window.

The floor robot is usually limited to operating close to the floor. Recognition of an open window or an open door can be impeded by perspective, an object in the field of view such as furniture, a pet, or a person. The window can be partially or completely behind a curtain and there can be objects such as potted plants or books on a windowsill. The window or door can be bordered by a wall to which an object such as a screen, a picture or a poster can be attached. An object can also be attached to the window or door itself, such as a translucent image or thermometer on a window, or a sticker or label on a door.

It can also be difficult to correctly recognize a window or door in a household. For example, a door can include a recessed window or a window can open in the manner of a door. A pass-through cannot count as a door or window, even if it can be opened and closed and objects can pass through it. A transparent skylight above a door cannot be opened and therefore does not need to be monitored, but a skylight in a flat roof can be considered as a window to be monitored. A sliding door cannot be recognizable as such when open. A windowpane can be covered so that a window can be difficult to recognize.

SUMMARY OF THE INVENTION

It is accordingly an object of the invention to provide an improved method for recognizing a state of an access element, such as a window or a door, in a household, a floor robot and a system, which overcome the hereinafore-mentioned disadvantages of the heretofore-known methods, robots and systems of this general type.

With the foregoing and other objects in view there is provided, in accordance with the invention, a method for recognizing an individual state of an access element relating to a room in a household, in which the individual access element can be brought into an open state and into a closed state. The method includes the steps of determining a position at which an individual access element is located in the household; non-contact scanning the individual access element while it is in a predetermined state; storing information regarding the individual access element on the basis of its scan and state; capturing a further non-contact scan of the individual access element in the household; and recognizing a state of the individual access element on the basis of the further non-contact scan and the stored and predetermined information. The dependent claims disclose preferred embodiments.

It has been recognized that a common technique for recognizing a generic access element or determining its state can be significantly improved in its recognition performance by additional training with the aid of scans of an individual access element in a predetermined household. Much of the preliminary work required to recognize a generic access element or its state can be done centrally using collected or generated data. The additional capture of information regarding the individual access element can require little effort and can also be at least partially automated.

In this way, a known and established technique for object or feature identification can be used to advantage without having to intervene in an associated preparation phase. Should the information for recognizing a generic access element or its state be updated, certain information regarding the individual access element can be additionally retained.

The access element preferably includes a door or a window. In general, the access element can include any structural element that can close an opening through which a person can enter the household or a room of the household. The access element can also include, for example, a sliding door, a double door, a gate, a folding door, a trap door, a revolving door, a screen door, a pivot window, a tilt window, or a hatch window. The window can be rectangular or have a different shape, for example round, triangular or oval.

It should be noted that an access element can be brought into multiple states, which can realize different degrees of obstruction of an intruding person. For example, the access element can be fully open, partially open, ajar, tilted, closed, latched or locked in different states. Some access elements can also assume different states. The point at which the state is to be considered closed or not closed can be defined individually for each access element. The definition can apply to all access elements of a room or household or only to an individual access element. In one embodiment, the individual access element can be considered closed if it cannot be opened by a person from the outside without tools or the use of force. Another example of an embodiment would be a tilted window through which no-one can enter, but through which moisture could enter during heavy rain.

In a preferred embodiment, the position of the access element is indicated by a user or a person assigned to the household. Optionally, in addition to the specific state, the certainty with which the state was detected can also be specified. An example message could be: "The kitchen window is fully open (detected with 95% certainty)". The positions of multiple access elements can also be specified, which can then be further processed accordingly. The position at which an access element is located and not located can be selected implicitly by the person, so that automatic differentiation cannot be necessary.

The access element can be scanned by an automatic floor robot. The floor robot is usually configured so as to move over a floor surface in the household and optionally also to clean it dry or damp. The floor robot can be controlled autonomously. In addition, the floor robot can be controlled by the household in order to assume a predetermined position or follow a predetermined path within the scope of a technique presented herein.

The further scan can be captured within the scope of cleaning a floor surface in the household. Thus, in addition to its primary task of cleaning the floor, the floor robot can advantageously be used to detect the state of the access element. Independently of this, a query or request to scan can also be captured and the scan can be performed in response thereto. For example, an event-, time- or user-controlled request can be made and the floor robot can react accordingly. A floor cleaning operation that is in progress can be interrupted for a scan in order to be able to provide rapid feedback regarding the state of the access element.

In a further embodiment, a specific state of an individual access element in the household can be provided to a person outside the household. Of course, states of multiple access elements can also be determined and made available to the person. In this way, the person can easily decide whether they have left the household in a sufficiently safe state. Multiple specific states can also be combined automatically so that the person can, for example, be informed in summary that either all or not all access elements of the room or household are closed.

On the basis of the position of the individual access element, a scanning position can be determined from which the scan takes place. Optionally, an advantageous orientation of the floor robot relative to the individual access element can also be determined. In a preferred embodiment, the position of the access element is determined with respect to a map of the surroundings of the room or household. An obstacle or a room boundary can be taken into account so that only one capturable and preferably informative scanning position can be determined.

With regard to the position, multiple scanning positions can be determined from which there are different perspectives of the access element so that the access element can be scanned comprehensively. The scanning positions can also have different lighting conditions, for example backlight, daylight or artificial light. The lighting conditions can be dependent on a current time, wherein a scanning position can also be selected depending on the time. In this way, the determination of the state of the individual access element can be improved and comprehensively learned.

The information regarding the individual access element can be stored separately from the information for recognizing a generic access element or its state. The information can have different formats. For example, the information for recognizing a generic access element or its state can be pre-processed and stored in a compact format. On the other hand, information regarding the individual access element can be stored in a less processed format. In one embodiment, raw data or unprocessed but compressed data can be stored so that subsequent processing or checking is simpler.

In one embodiment, a link is established between the information regarding the individual access element and the information regarding generic access elements. For example, it is possible to determine where a hand lever is located on the individual access element and the hand lever can be linked to the generic information in such a way that a position of the hand lever can be recognized in an improved manner. In another embodiment, a position of the hand lever on the individual access element can be determined and compared with positions of generic access elements on the basis of the link in order to derive a state from the position.

Information that is assigned to different individual access elements in the household can be stored separately from one another. In one embodiment, each set of information that is assigned to an individual access element is assigned to its own storage area, own database or own model.

The information for recognizing a generic access element or its state can be available as a trained artificial neural network (ANN). The stored information regarding the individual access element can also be available as an ANN or also as raw data, as an image, as an extract (digest) or as a link to information regarding a generic access element.

It should be noted that the information stored for recognizing generic objects does not have to be limited to access elements. In one embodiment, such information can also be configured so as to recognize other objects found in a household, such as a piece of furniture, a pet or an obstacle lying on the floor surface, such as a cable or carpet.

The floor robot can be controlled so as to bring the individual access element into the closed state after it has been determined that it is not in a closed state. For example, the floor robot can approach an open door that is projecting into the room at a certain angle and push the door towards the door frame until it snaps shut. This can apply in particular to an individual access element that extends close to a floor surface on which the floor robot travels. An individual access element can be assigned information as to whether closing is desired (or possible) or not. For example, a connecting door between two rooms in the household can be left open, while a balcony door can be closed if possible. Closing the access element not only reduces the risk of unwanted entry by a person, but also the penetration of unwanted external influences, such as rain.

With the objects of the invention in view, there is also provided a floor robot including a facility for determining a position at which an individual access element is located in the household; the individual access element being able to be brought into an open state and into a closed state; a scanning facility for non-contact scanning the individual access element while it is in a predetermined state; a first storage device having predetermined information for recognizing a generic access element or its state; a second storage device for storing information regarding the individual access element on the basis of its scan and state; and a processing facility that is configured so as to recognize a state of the individual access element in the household on the basis of a further non-contact scan and the predetermined and stored information.

The processing facility can be configured so as to perform entirely or in part a method described herein. For this purpose, the processing facility can be electronic and include, for example, a programmable microcomputer or microcontroller and the method can be in the form of a computer program product with program code means. The computer program product can also be stored on a computer-readable data carrier. Features or advantages of the method can be transferred to the device or conversely.

The floor robot can be configured so as to process a floor surface in the household and to capture the further scan of the individual access element within the scope of processing of the floor surface. In particular, the processing can include cleaning the floor surface. The cleaning can be dry and involve, for example, vacuuming or sweeping, or can be wet, using a cleaning fluid, and involve, for example, mopping or damp stripping.

With the objects of the invention in view, there is concomitantly provided a system including a floor robot described herein and an interaction facility for a user which is wirelessly coupled to the processing facility. In particular, the interaction facility can include a device that is assigned to the user such as a smartphone, a laptop computer or a tablet computer. Other interaction, for example by voice control, can also be possible. A cooperative or interactive scanning of an individual access element can be carried out by the interaction facility. A user can ensure a predetermined state of the access element or specify a position of an access element. The interaction facility is preferably capable of graphically outputting information so that information regarding a graphical representation of the household can be provided. The graphical representation can be determined on the basis of map data that has been collected or provided by the ground robot.

Other features which are considered as characteristic for the invention are set forth in the appended claims.

Although the invention is illustrated and described herein as embodied in a method for recognizing a state of an access element, such as a window or a door, in a household, a floor robot and a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
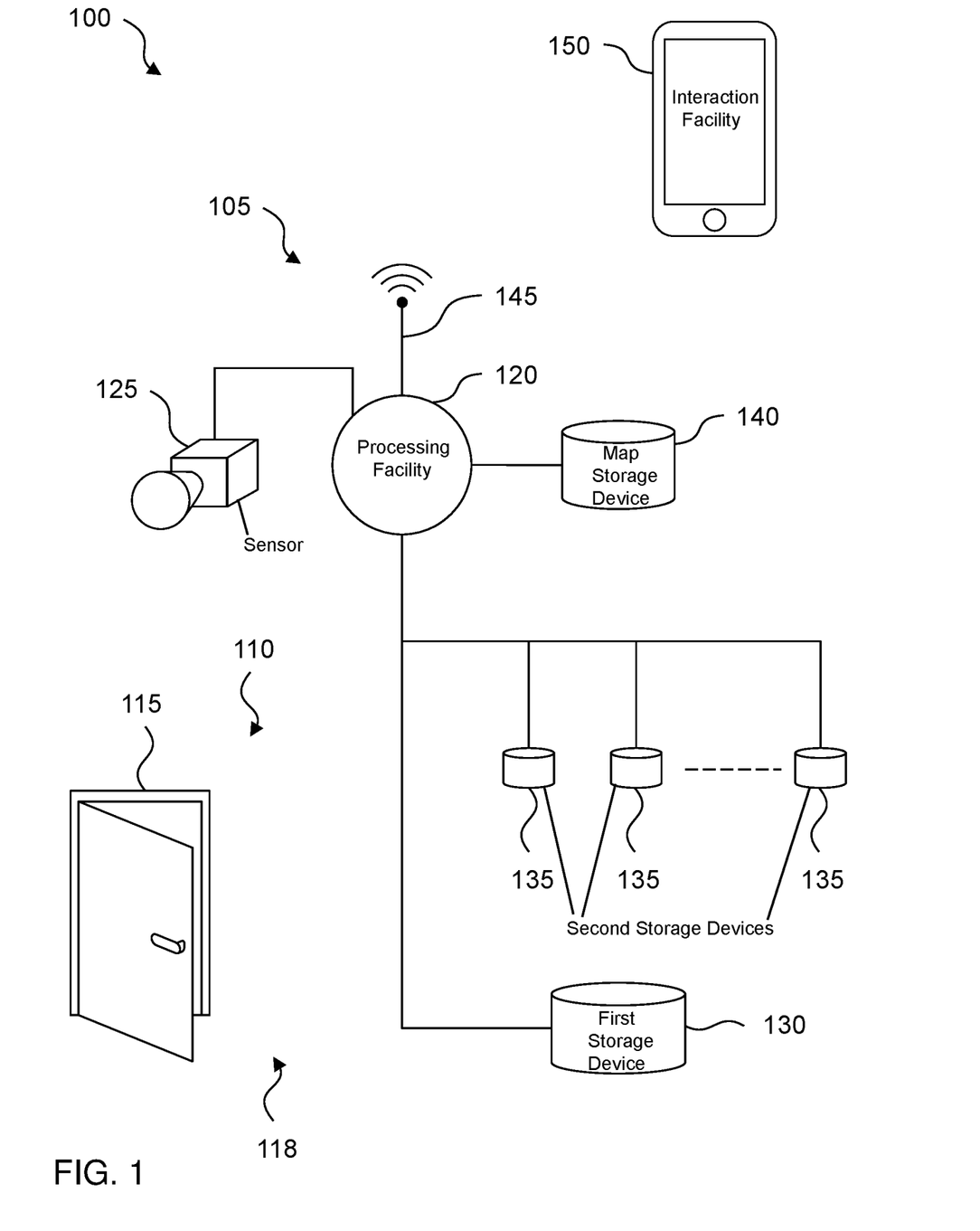
FIG. 1 is a diagrammatic and schematic view of a floor robot in a household.

Referring now to the figures of the drawings in detail and first, particularly, to FIG. 1 thereof, there is seen a system 100 having a floor robot 105 in a household 110. The household 110 usually includes at least one room that can be delimited by an access element 115. The access element 115 usually includes a door or a window and can be brought into various states that can allow or prevent entry. The household 110 includes a floor surface 118 on which the floor robot 105 can travel. Preferably, the floor robot 105 is configured so as to process the floor surface 118 and, in particular, to clean it. Elements of the floor robot 105 for locomotion and for processing the floor surface 118 are not shown in FIG. 1.

The floor robot 105 preferably includes a processing facility 120 and a sensor 125 for non-contact and preferably optical scanning of an environment. The sensor 125 can include, for example, a camera, a radar sensor or a LIDAR sensor. In addition, a first storage device 130 with information for recognizing a generic access element 115 or its state and further preferably a second storage device 135 for storing information regarding an individual access element 115 that is present in the household 110 can be provided. A plurality of second storage devices 135 or storage device areas can also be provided, which are logically separated from one another so that in each case items of information that are stored do not interact with one another in an uncontrolled manner. Each second storage device 135 can be assigned to a dedicated individual access element 115 in the household 110.

Furthermore, the floor robot 105 preferably includes a map storage device 140 for storing map data regarding the household 110. On the basis of a scan of its environment, the floor robot 105 can recognize a boundary of the household 110, for example by a wall, or an object, for example a piece of furniture. The map data can be created or updated on this basis. A path to be traveled in the household 110 can be planned with respect to the map data.

A wireless interface 145 can be provided for communication with an interaction facility 150. The system 100 can include an interaction facility 150 in addition to the floor robot 105.

A generic object in the household 110 can be recognized on the basis of a scan by the sensor 125 regarding information of the first storage device 130. It is proposed to additionally teach the recognition of an individual access element 115 that is to be found in the household 110 and to store information regarding the individual access element 115 in the second storage device 135. The individual access element 115 and/or its state can then be recognized on the basis of the information that is stored in the second storage device 135. Information from the first memory 130 is also preferably used for this purpose.

Figure 2:
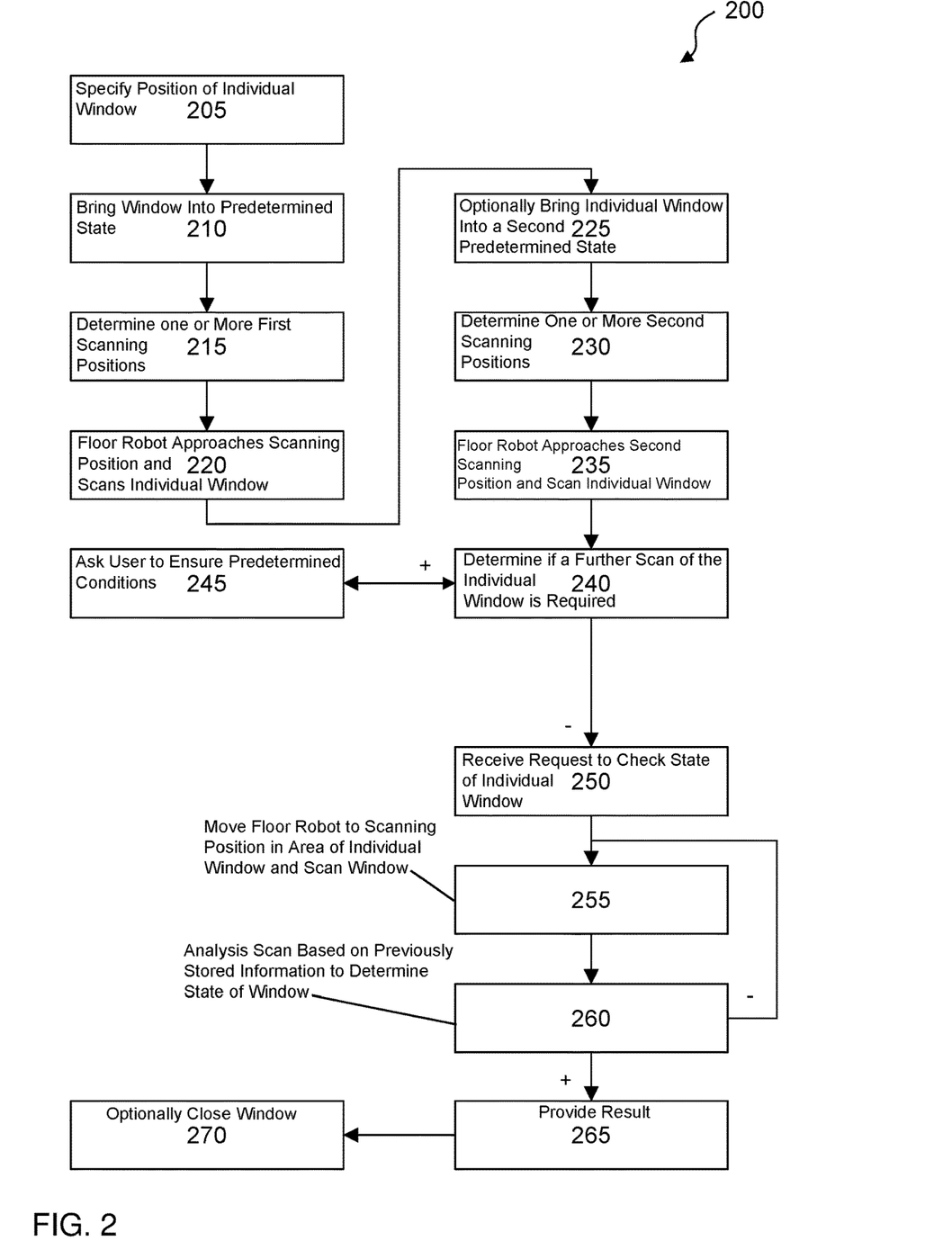
FIG. 2 is a flow chart of a method.

FIG. 2 shows a flow chart of a method 200 that can be carried out in particular by a system 100. The method 200 includes two phases, which can also be regarded as independent methods. In the following, a window is treated as an exemplary access element 115; another access element can be treated in a corresponding manner.

A first phase begins in a step 205, in which a position of an individual window 115 is specified. A user can specify the position, for example by using the interaction facility 150. Preferably, a graphical view on map data of the household 110 is provided to the user and the user can specify a position on the map data for the individual window 115.

In a step 210, the individual window 115 can be brought into a predetermined state. In particular, this state can in particular identify a closed state in which a person or object can be prevented from passing through the window 115 into the household 110. The person can be asked to set the predetermined state on the window 115.

In a step 215, one or more first scanning positions can be determined in the area of the position of the individual window 115. The scanning positions can allow advantageous and different perspectives of the individual window 115 and can be reached by the floor robot 105 on the floor surface 118. Not only the exact scanning position of the robot is relevant here, but also the orientation of the permanently mounted camera in the direction of the access element as well as the time of day in order to be able to enable comparable lighting conditions in the future.

In a step 220, the floor robot can approach a scanning position and perform a scan of the individual window 115. In the case of multiple scanning positions, these can be approached one after the other and multiple scans can be performed. The scans can be stored unprocessed or processed in the second storage device 135. In each case, a reference to the predetermined state and/or position can be added.

Optionally, in a step 225, the individual window 115 can be brought into a second predetermined state, for example opened, tilted or ajar. In a step 230, one or more second scanning positions can be determined. Optionally, the first scanning positions can also be used again. In a step 235, a second scanning position can be approached and the individual window 115 can be scanned. Steps 230 and 235 can correspond to steps 215 and 220, respectively.

Optionally, steps 225 to 235 can be performed with regard to a further state of the individual window. This process can be repeated for each state to be recognized.

In a step 240, it can be determined whether a further scan of the individual window 115 is required. This may be the case if the stored information, optionally with the aid of the generic information in the first storage device 130, is not sufficient in order to recognize the individual window or its state on the basis of a further scan. In this case, the user can be asked in a step 245 to ensure predetermined conditions, for example certain lighting conditions or the absence of a piece of furniture or wall decoration in the area of the individual window 115. A further scan can then be performed. A scanning position for this can be assumed beforehand. The steps 240, 245 can also be run through multiple times if necessary, for example at different times of day under different lighting conditions.

If sufficient information is stored in the second storage device 135 to allow the individual window 115 or its state to be recognized, the first phase of the method 200 can be completed.

A second phase begins in a step 250, in which a request to check a state of the individual window 115 can be received. The request can be explicit and can, for example, be triggered by a user who wishes to know the state of one or more windows or doors 115 of the household 110. The request can also be time-controlled, for example. In a still further embodiment, the request is implicit, for example in that the floor robot 105 performs a cleaning activity in the household 110 and is thereby requested to determine the state of the window 115.

In a step 255, the floor robot 115 can move to a scanning position in the area of the position of the individual window 115. The scanning position can be precisely planned or a scanning position can be used that is located in a predetermined area around the position, for example at a predetermined maximum distance. A scan of the window 115 can then be performed.

In a step 260, the scan can be analyzed on the basis of previously stored information in order to determine the state of the window 115. For this purpose, the window 115 can first be recognized on the scan. It can be necessary to examine a predetermined detail of the window 115 more closely, such as a vertical edge or the position of an operating lever. Information that is contained in the scan can be compared with stored information in order to determine the state. If a result is available, it can be determined whether the result could be determined with a sufficiently high degree of certainty or whether there is another possible result, so that no clear statement can be made regarding the state. In this case, the method 200 can branch back to step 255 and perform a new scan, possibly from a different scanning position.

Otherwise, the result can be provided in a step 265, for example in the form of a message to a person. The result can also be provided in other ways, such as in machine-readable form in order to be able to be further processed by another system. Optionally, in a step 270, an attempt can be made to close a window 115 that has been determined by the floor robot 105 to not be closed. For this purpose, the floor robot 105 can carefully approach the window that is not closed and then follow a course to push the window 115 into a closed position.

Figure 3:
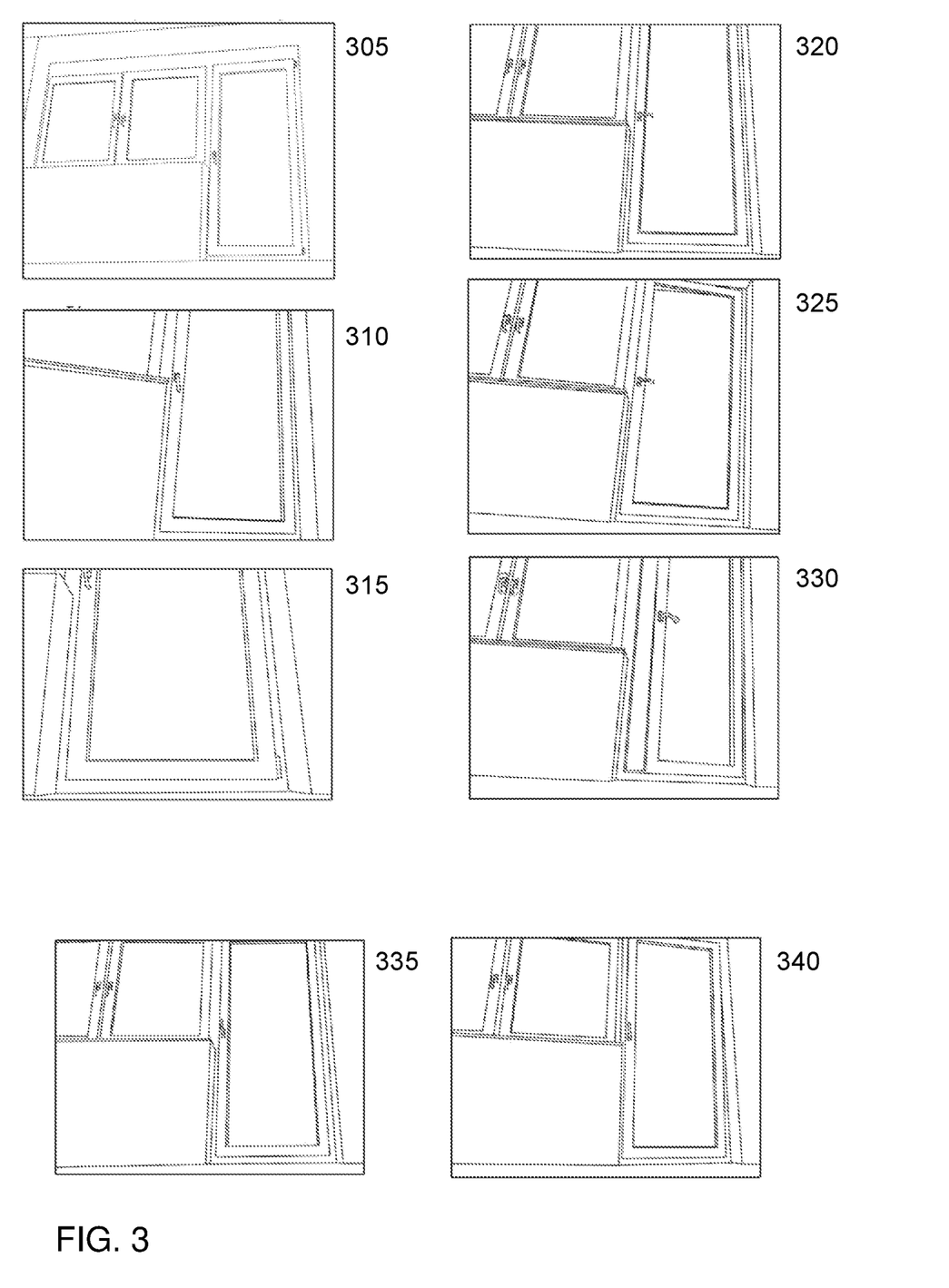
FIG. 3 includes perspective views showing exemplary scans of an individual door in a household.

FIG. 3 shows exemplary scans of an individual door 115 in a household 110. It is to be understood that the individual door 115 is representative of any individual access element 115 in a household 110. The scans are based on optical images taken by a floor robot 105, which has assumed a scanning position on the floor surface 118 in the area of a position of the individual door 115.

The first scans 305, 310 and 315 relate to the individual door 115 in a closed state from various scanning positions. Joints around the door leaf with respect to a door frame are closed and of constant width. An operating lever is in a substantially vertical position. At no point is a gap recognizable on the individual door 115.

Second scans 320, 325 and 330 relate to the individual door 115 that is in a state in which it is not closed. The operating lever is in a horizontal position, so that it can be recognized that the individual door 115 is not locked. In scan 325, a gap can be seen at one upper end of the door leaf towards the frame. In the scan 330, it is even possible to see through to the left of the door leaf.

Third scans 335, 340 relate to the individual door 115 in a partially closed state, in which the door leaf is tilted inwards in the vertical direction in the frame. Whether this state is interpreted as closed or not closed can be predetermined. The operating lever is in the vertical position so that the individual door 115 is locked in its state. In the scan 335, the tilted state can hardly be perceived. In the scan 340, it can be recognized in an upper right area of the door leaf that the door is tilted relative to the door frame.

Overall, it should be noted that determining the state of the individual door 115 can include recognizing the individual door 115 on a scan 305-340, identifying a predetermined feature of the individual door 115, recognizing the feature and/or logically associating the feature with another recognized feature.

Figure 4:
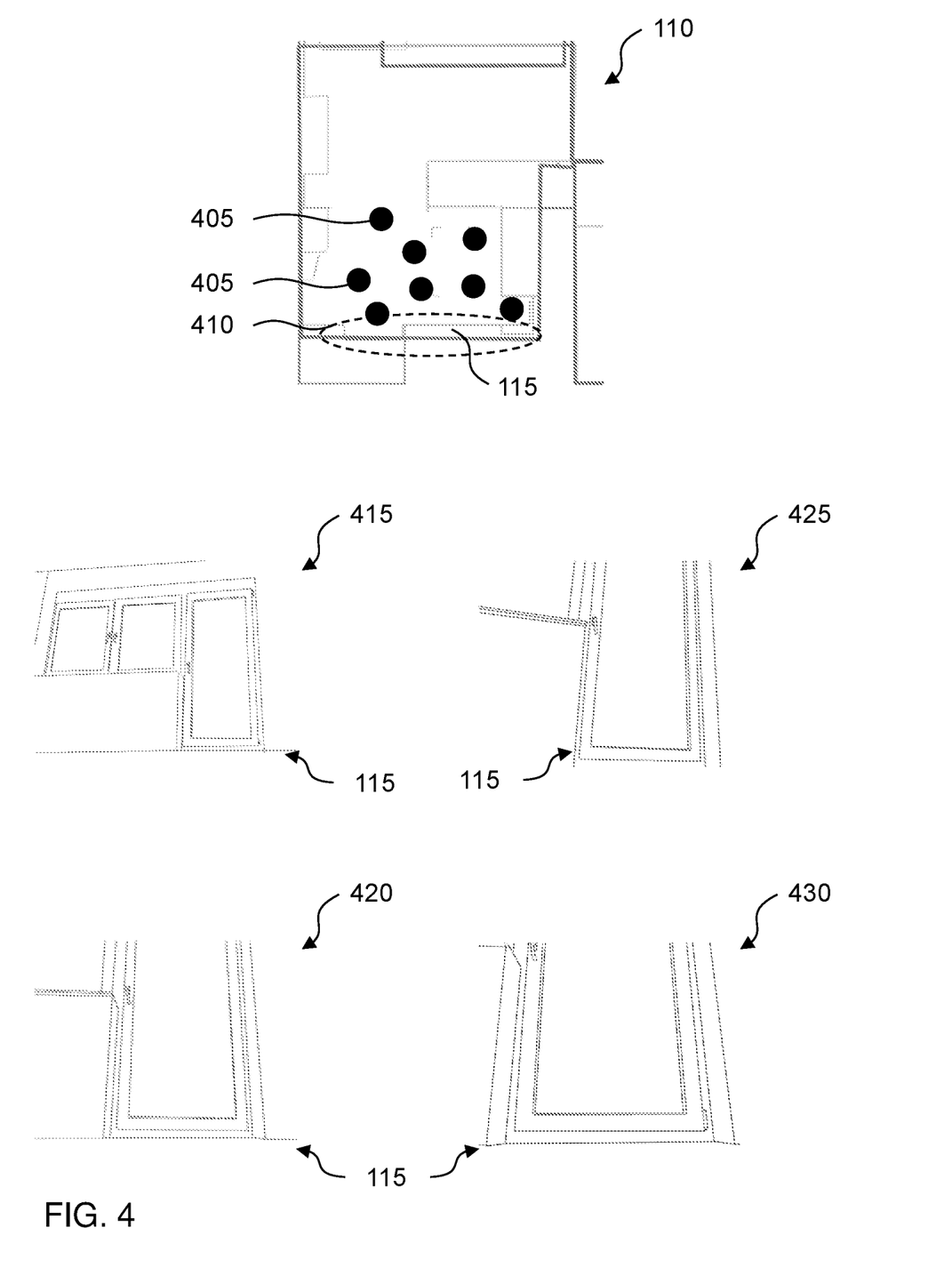
FIG. 4 includes an elevational view showing exemplary scanning positions in a household and perspective views of scans of an individual door in the household from different scanning positions.

FIG. 4 shows exemplary scanning positions 405 in a household 110 and scans of an individual door 115 in the household 110 from different scanning positions 405.

With regard to a cartographic representation of a section of the household 110, a position 410 of the individual door 115 has been determined, for example by a user of the system 100. Naturally, the individual door 115 closes off a room of the household 110. On one side of the individual door 115 where the floor robot 105 is located, various scanning positions 405 are determined that provide different perspectives of the individual door 115 and are accessible by the floor robot 105. From these scanning positions 405, the individual door 115 can be advantageously scanned.

Four scanning positions 415-430 each relate to the individual door 115 either in full height or in a lower section down to the floor surface 118. The scanning positions 415-430 are purely exemplary and are not assigned to specific scanning positions 405 marked in the upper area. It can be seen how different scanning positions 405 have a strong influence on size ratios and a distortion of the scanned individual door 115. In addition, there can be an influence on lighting conditions during scanning. For good recognition of the individual door 115, a feature thereof or a state of the individual door 115, it can be useful to select a scanning position 405 that allows a clear image and is preferably as similar as possible to a scanning position 405 used to learn the individual door 115. However, not every desirable scanning position 405 can be assumed, for example because a scanning position 405 or a view from the scanning position 405 to the individual door 115 is obstructed by a piece of furniture.

The following is a summary list of reference numerals and the corresponding structure used in the above description of the invention:

- 100 System
- 105 Floor robot
- 110 Household
- 115 Access element, in particular window or door
- 118 Floor surface
- 120 Processing facility
- 125 Sensor
- 130 First storage device
- 135 Second storage device
- 140 Map storage device
- 145 Wireless interface
- 150 Interaction facility
- 200 Method
- 205 Specify position of the window
- 210 Window in first position
- 215 Determine first scanning positions
- 220 Approach first scanning positions, perform scans
- 225 Window in second position
- 230 Determine second scanning positions
- 235 Approach second scanning positions, perform scans
- 240 Is a further scan necessary?
- 245 Request support, perform scan
- 250 Receive request to check the window
- 255 Approach scanning position and perform scan
- 260 Unambiguous result?
- 265 Provide message
- 270 Close window
- 305-315 First scans
- 320-330 Second scans
- 335-340 Third scans
- 405 Scanning positions
- 410 Position of an individual access element
- 415-430 Further scans

The invention claimed is:

1. A method for recognizing a state of an individual access element relating to a room in a household, the method comprising:
   providing an individual access element configured to be brought into an open state and into a closed state;
   determining a position at which the individual access element is located in the household;
   performing a non-contact scan of the individual access element while in a predetermined state;
   storing information regarding the individual access element based on the non-contact scan and the predetermined state;
   capturing a further non-contact scan of the individual access element in the household;
   recognizing the state of the individual access element based on the further non-contact scan, the stored information and predetermined information; and
   making items of information for recognizing a generic access element or a state of the generic access element, available as a trained artificial neural network.

2. The method according to claim 1, which further comprises providing a door or a window as the access element.

3. The method according to claim 1, which further comprises using an automatic floor robot to scan the access element.

4. The method according to claim 3, which further comprises capturing the further non-contact scan within a scope of cleaning a floor surface in the household.

5. The method according to claim 1, which further comprises providing a specific state of an individual access element in the household to a person outside of the household.

6. The method according to claim 1, which further comprises determining a scanning position from which the non-contact scan or the further non-contact scan takes place, based on the position of the individual access element.

7. The method according to claim 6, which further comprises determining the scanning position on a basis of a map of surroundings of the household.

8. The method according to claim 1, which further comprises storing information regarding the individual access element separately from information for recognizing a generic access element or a state of the generic access element.

9. The method according to claim 1, which further comprises storing items of information assigned to different individual access elements in the household, separately from one another.

10. The method according to claim 1, which further comprises activating a floor robot to bring the individual access element into the closed state after having determined that the individual access element is not in the closed state.

11. A floor robot, comprising:
    a mobile computer for determining a position in a household of an individual access element configured to be brought into an open state and into a closed state;
    a scanner configured to non-contact scan the individual access element while the individual access element is in a predetermined state;
    a first storage device having predetermined information for recognizing a generic access element or a state of the generic access element;
    a second storage device for storing information regarding the individual access element based on the non-contact scan and the predetermined state; and
    a processor configured to recognize the state of the individual access element in the household based on a further non-contact scan, the predetermined information and stored information.

12. The floor robot according to claim 11, wherein the floor robot is configured to process a floor surface in the household, and to capture the further non-contact scan of the individual access element within a scope of processing the floor surface.

13. The floor robot according to claim 11, wherein items of information for recognizing a generic access element or a state of the generic access element are available as a trained artificial neural network.

14. A system, comprising:
    a floor robot according to claim 11;
    said processor and said mobile computer being configured to be wirelessly coupled to each other.

* * * * *